Aug. 6, 1968    H. L. RATLIFF, JR    3,395,498
METHOD OF MAKING LENSES FOR WIDE-ANGLE OCULARS
Original Filed April 24, 1963    3 Sheets-Sheet 1

INVENTOR
Harvey L. Ratliff Jr.

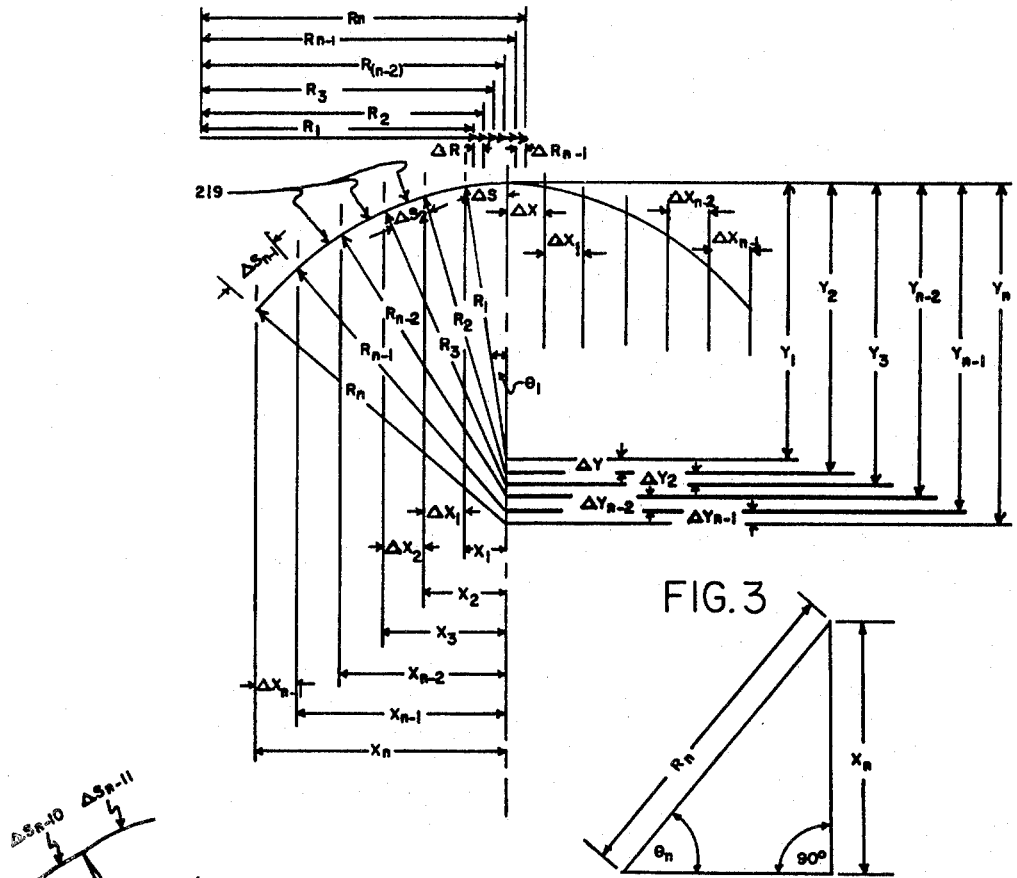
FIG. 3
FIG. 4
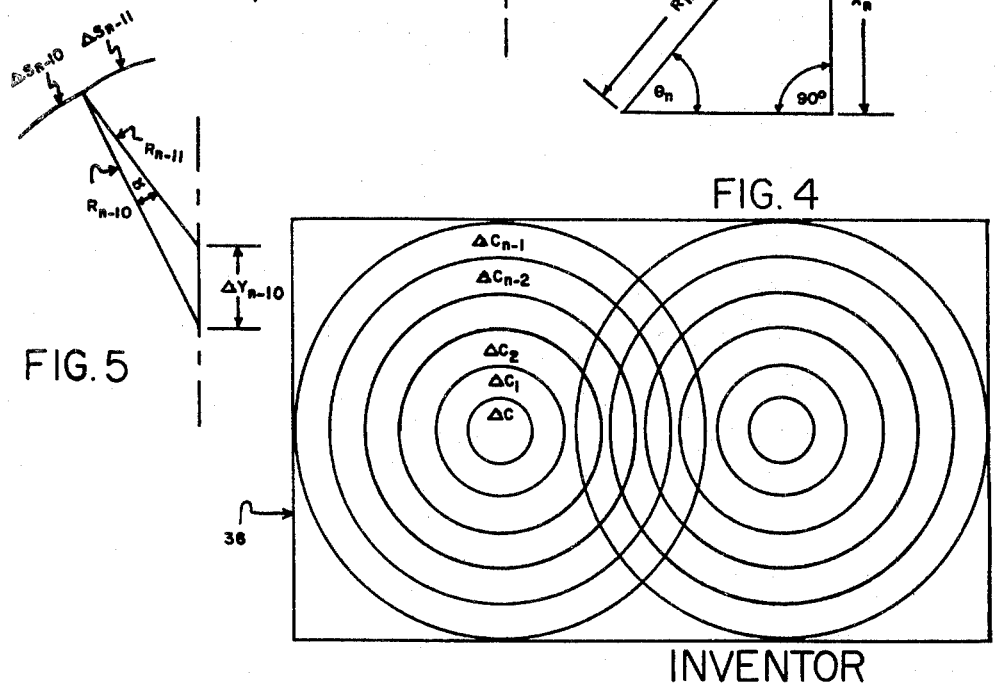
FIG. 5
FIG. 6
INVENTOR
Harvey L. Ratliff Jr.

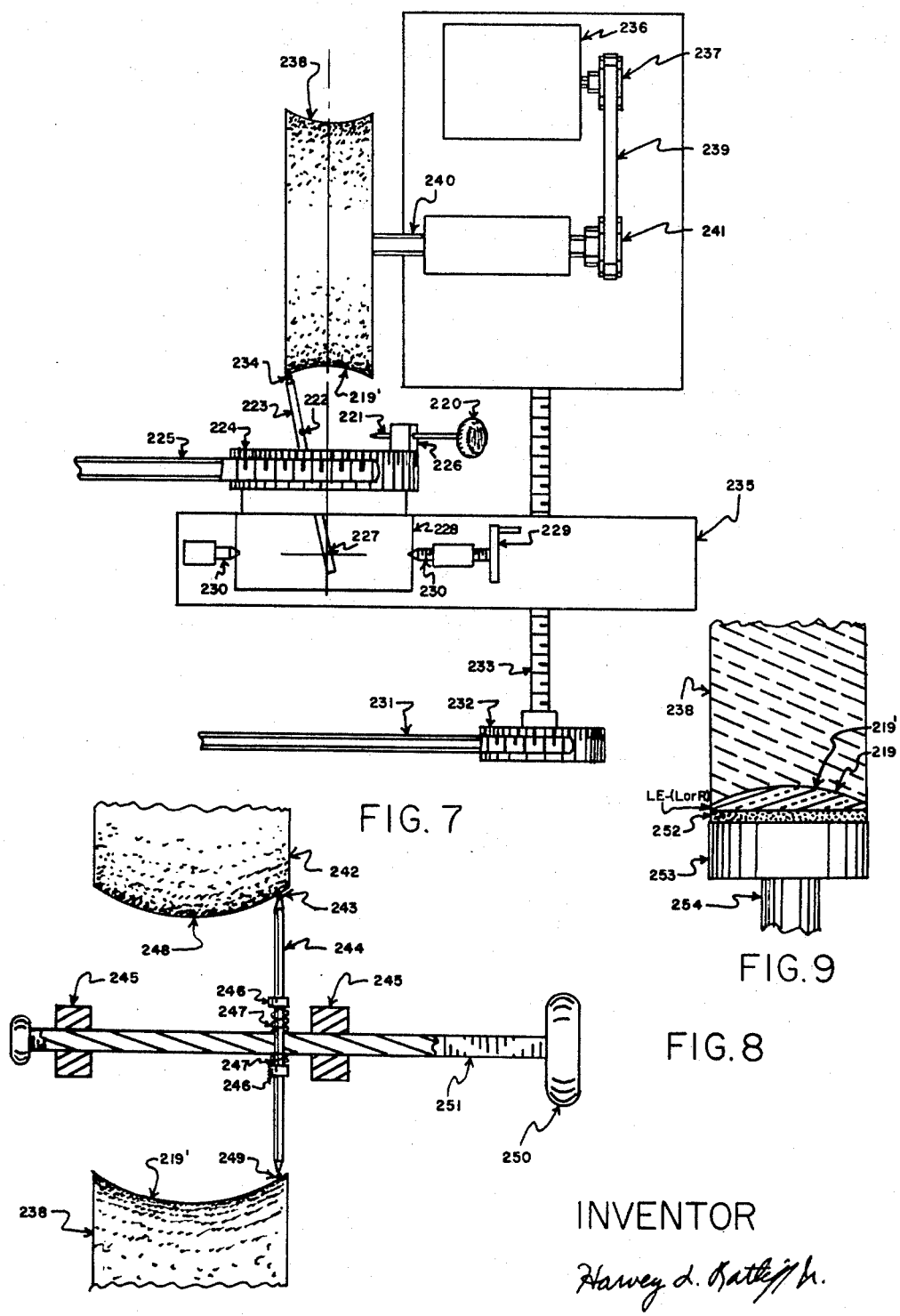

United States Patent Office 3,395,498
Patented Aug. 6, 1968

3,395,498
METHOD OF MAKING LENSES FOR
WIDE-ANGLE OCULARS
Harvey L. Ratliff, Jr., Oxon Hill, Md., assignor to
Jetru Inc., Amarillo, Tex.
Original application Apr. 24, 1963, Ser. No. 275,411.
Divided and this application Oct. 18, 1965, Ser.
No. 505,117
2 Claims. (Cl. 51—284)

The present application is a divsioin of my copending Patent Application 275,411, filed April 24, 1963, now abandoned. The present invention relates generally to methods for making lenses and particularly to methods for making lenses which are designed primarily, but not exclusively, for lenses used in wide-angle oculars. For example the lenses could be used as wide-angle taking lenses.

In the art of wide-angle stereoscopic re-creation it is desirable that the images appear to originate at distances far behind the actual image viewed, since the image is relatively close to the eyes of the viewing observer. For the most relaxed viewing, all the rays from the images should enter the eyes of the viewing observer as parallel rays.

It is the primary object of the present invention to teach a method resulting in a lens which will render all the rays (entering the eyes of an observer from 0° to over 70° in both directions—140° in all) from a flat image substantially parallel or parallel. The lenses of the prior art approach this objective, but do not reach it satisfactorily.

It is well known that if an image portion is placed at the focal plane of a lens portion, the lens portion will render the rays from the image portion parallel. The wide angle oculars of the prior art which bend the peripheral rays to enter the pupils of the eyes of a viewer at very wide angles require multi-element oculars, either two coaxial lenses in each ocular or a multiplicity of small diameter, small radius, contiguous lenses in each. The prior art does teach methods of making variable focal length lenses for spectacles or the like, but it does not teach a method of making a lens assuredly suitable to use as a single element wide-angle ocular which assures that both the central rays and peripheral wide-angle rays enter the pupils of the eyes parallel when there is a substantial difference in the distance from the central lens portion to a central (object plane) image portion and the distance from a peripheral lens portion to the peripheral (object plane) image portion as does the present invention.

Figure 1:
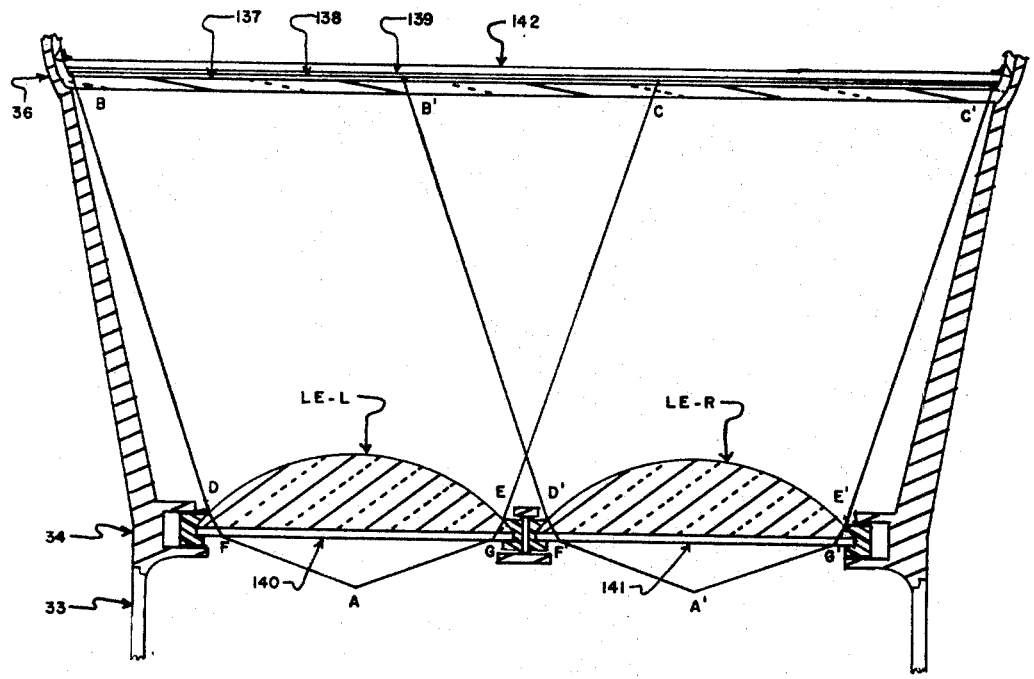

Other objects and advantages of my invention will become more apparent from a study of the following description taken with the accompanying drawings wherein:

FIG. 1 is a sectional view of the optical portion of a kinescopic optical viewing device showing a contemplated application of the lens produced by the present invention.

FIGS. 2–6 diagrammatically illustrate the structural make up of a lens resulting from the present invention and some concepts involved therein.

FIGS. 7–9 are designed to diagrammatically illustrate the apparatus required to carry out the present invention.

Figure 2:
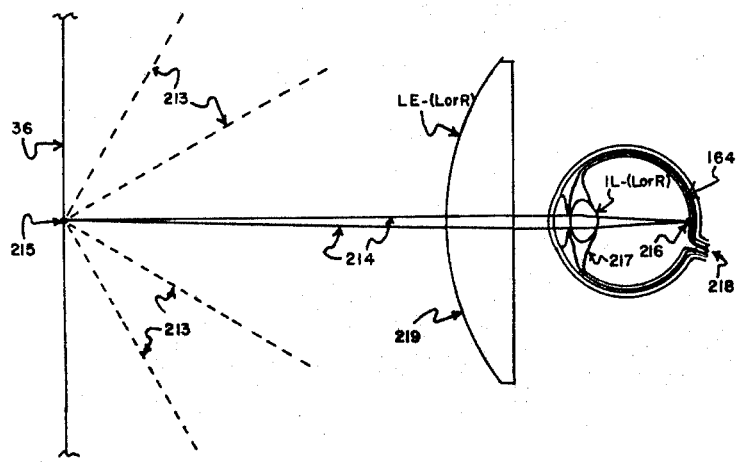

Referring more particularly to the drawings. Reference is first made to FIGS. 1 and 2. It is desired that all the rays leaving screen 36 from each point 215 enter the iris 217 as parallel rays to be focused by lens 1L–L or 1L–R upon retina 164 with a minimum amount of effort on the part of iris 217, so that all the rays within cones FAG and F'A'G' may be viewed while iris 217 is in a relaxed position.

Reference is now made to FIGS. 3 and 4 in order to explain the contemplated aspherical shape of surface 219. Surface 219 is divided into any desirable number ($n$) of spherical portions $\Delta S$, $\Delta S_1$, $\Delta S_2$ . . . $\Delta S_{n-2}$, $\Delta S_{n-1}$. FIG. 3 is an enlarged cross section of one form of surface 219. The X dimension of each said spherical portion is $\Delta X$, $\Delta X_1$, $\Delta X_2$ . . . $\Delta X_{n-2}$, $\Delta X_{n-1}$, respectively. The Y dimension of each said spherical portion is $\Delta Y$, $\Delta Y_1$, $\Delta Y_2$ . . . $\Delta Y_{n-2}$, $\Delta Y_{n-1}$ respectively. The radius of curvature of each respective spherical portion is $R_1$, $R_2$, $R_3$ . . . $R_{n-1}$, $R_n$ respectively. The distance below the central point of surface 219 on the axis of surface 219 of the center of curvature of each respective said spherical portion is $Y_1$, $Y_2$, $Y_3$ . . . $Y_{n-1}$, $Y_n$ respectively. The longest peripheral perpendicular distances of each said respective spherical portion from said axis of said surface 219 are $X_1$, $X_2$, $X_3$ . . . $X_{n-1}$, $X_n$ respectively. Obviously $\Delta X = X_1$. The angles at each respective center of curvature between said axis and the corresponding outer peripheral point (or circle) of each respective spherical portion, are $\theta_1$, $\theta_2$, $\theta_3$ . . . $\theta_{n-1}$, $\theta_n$ respectively (see FIG. 4).

Reference is now made to FIG. 5. It is desirable that each of said spherical portions is of such dimension that any distortion produced upon the eye of a viewing observer because of the junction between any two juxtaposed portions, ($\Delta S_{n-11}$ and $\Delta S_{n-10}$, for example having radii of curvature $R_{n-11}$ and $R_{n-10}$ respectively, having $Y_{n-11}$ and $Y_{n-10}$ respectively as the distances below the central point of surface 219 on the axis of said surface 219 to each respective center of curvature, said centers of curvature being $\Delta Y_{n-10}$ apart) is beneath the resolving power of the eye. It is considered that angle $\alpha$ (alpha) should be less than, or in very close proximity to one minute (1') in order to accomplish this. In the contemplated form of the invention, the following is true:

Condition 1

In the exemplary design the X increments are equal or:

$$X_n/n = \Delta X = \Delta X_1 = \Delta X_2 \ldots = \Delta X_{n-2} = \Delta X_{n-1}$$

Condition 2

In the exemplary design a well known manner is utilized to set the radii of curvature ($R_1$ and $R_n$) of the center and peripheral edge of 219 such as is required to render the rays which enter the pupils of the viewer's eyes parallel and the radii of curvature of the portions between $R_1$ and $R_n$ are set to respectively differ in length as follows:

$$\frac{R_n - R_1}{n} = \Delta R = \Delta R_1 = \Delta R_2 \cdot \cdot \cdot \cdot = \Delta R_{n-2} = \Delta R_{n-1}$$

It may be appropriate at this time to set forth an example of one of the well known methods of determining the well known relationship that inherently exists when the radius of curvature of a lens portion will render the image rays parallel from a corresponding image portion. The exemplary method chosen for expressing this inherent relationship is the "Lens Maker's Equation for Thin Lenses":

$$1/f = (n_1 - n_2)(1/r' - 1/r'')$$

where $f$ is the distance from a lens spherical portion (i.e. $\Delta S_{11}$) to a corresponding image portion (i.e. $\Delta C_{11}$ of FIG.

6 which will be described in greater detail hereinafter), $n_1$ is the refractive index of the lens, $n_2$ is the refractive index of the surrounding media, $r'$ is the radius of curvature of the lens surface nearest the image portions and $r''$ is the radius of curvature of the other lens surface furtherest from the image portions.

From elementary algebraic manipulation of the "Lens Maker's Equation for Thin Lenses," it follows that:

$$1/r' = 1/f(n_1-n_2) + 1/r''$$

and $$r' = \frac{(f)(r'')(n_1-n_2)}{r'' + f(n_1-n_2)}$$

of course, if the lens is plano-convex, $r'' \to \infty$, and:

$$1/r' = 1/f(n_1-n_2)$$

or $$r' = f(n_1-n_2)$$

It is, of course, clear herefrom that in the case of narrow angle oculars, $f_n \cong f_1$, where $f_n$ is the distance from $\Delta S_{n-1}$ to $\Delta C_{n-1}$ and $f_1$ is the distance from $\Delta S$ to $\Delta C$, but in the case of wide angle oculars, $f_n > f_1$ significantly.

It may therefore be seen that for the case of the arbitrarily chosen plano-convex lens:

$$R_n = f_n(n_1-n_2) \text{ and } R_1 = f_1(n_1-n_2)$$

and for the arbitrarily chosen example set forth herein:

$$R_n = 3.1(0.5) \text{ and } R_1 = 2.6(0.5)$$

or $$R_n = 1.55 \text{ and } R_1 = 1.30$$

*Condition 3*

From trigonometry it follows that:

$\theta_1 = $ arc sin $X_1/R_2$ $\theta_2 = $ arc sin $X_2/R_2$ $\theta_3 = $ arc sin $X_3/R_3$ ...

$\theta_{n-1} = $ arc sin $X_{n-1}/R_{n-1}$ $\theta_n = $ arc sin $X_n/R_n$

*Condition 4*

It can be seen from FIG. 3 that:

$X_1 = 0 + \Delta X$ $X_2 = X_1 + \Delta X_1$ $X_3 = X_2 + \Delta X_2$ ...

$X_{n-1} = X_{n-2} + \Delta X_{n-2}$ $X_n = X_{n-1} + \Delta X_{n-1}$

*Condition 5*

In the instant wide angle lens which has a focal length shorter than approximately 1¾ times the lens diameter, the central rays are rendered parallel when the central radius of curvature is 1.30 inch and the peripheral rays are rendered parallel when the peripheral radius of curvature is 1.55 inch; it may therefore be seen that:

$R_1 = 1.30$ inch $R_2 = R_1 + \Delta R_1$ $R_3 = R_2 + \Delta R_2$ ...

$R_{n-1} = R_{n-2} + \Delta R_{n-2}$ $R_n = R_{n-1} + \Delta R_{n-1} = 1.55$ inch

*Condition 6*

It may therefore be seen that:

$Y_1 = 1.30$ $Y_2 = Y_1 + \Delta Y_1$ $Y_3 = Y_2 + \Delta Y_2$ ...

$Y_{n-1} = Y_{n-2} + \Delta Y_{n-2}$ $Y_n = Y_{n-1} + \Delta Y_{n-1}$

First resultant of the above conditions since $\alpha$ is very small; it may be seen from the application of elementary trigonometry to FIG. 5 that:

$$\Delta R_{n-11} = R_{n-10} - R_{n-11}$$

$$\theta_{n-10} = \text{arc sin } X_{n-11}/R_{n-10}$$

and $$\Delta Y_{n-11} = \Delta R_{n-11} \sec \theta_{n-10}$$

therefore $\Delta Y_1 = (\Delta R_1) \sec $ arc sin $X_1/R_2)$ $\Delta Y_2 = (\Delta R_2) \sec $ (arc sin $X_2/R_3)$ $\Delta Y_3 = (\Delta R_3) \sec $ (arc sin $X_3/R_4)$ ...

$\Delta Y_{n-2} = (\Delta R_{n-2}) \sec $ (arc sin $X_{n-2}/R_{n-1})$ $\Delta Y_{n-1} = (\Delta R_{n-1}) \sec $ (arc sin $X_{n-1}/R_n)$ Since $\Delta Y_{n-1}$ is obviously the largest Y increment in the contemplated form of this invention, $\Delta Y_{n-1}$ when $\alpha = 1$ minute will now be calculated.

$$\Delta Y_{n-1} = \frac{R_n \sin \alpha}{\sin \left( \text{arc sin } \frac{X_n}{R_n} \right)}$$

therefore:

$$\Delta Y_{n-1} = R_n/X_n \sin \alpha$$

or $$\Delta Y_{n-1} = 0.00059 \text{ inch (2nd resultant)}$$

therefore $$\Delta R_{n-1} = \frac{\Delta Y_{n-1}}{\sec \left( \text{arc sin} \frac{X_{n-1}}{R_n} \right)}$$

$\Delta R_{n-1} = 0.0003825$ inch (third resultant)

Because of (condition 2):

$$n = \frac{R_n - R_1}{\Delta R_{n-1}} = \frac{0.25}{0.0003825}$$

$n = 654$ (fourth resultant)

Because of (condition 1) and the fact that the arbitrarily chosen lens has a diameter of 2.36 inch:

$$\Delta X = X_n/n = 1.18/654$$

or $\Delta X = 0.001805$ inch (fifth resultant)

It may now be seen that in the contemplated form of the invention, every R increment is 0.0003825 inch; every X increment is 0.001805 inch and every Y increment is less than 0.00059 inch except $\Delta Y_{n-1}$ which is 0.0059 inch.

It is here pointed out that the conditions could of course have been that all the Y increments are equal to each other, the R increments are equal to each other, and the X increments vary.

In order to more completely explain the function of aspherical surface 219 of lens LE (L or R), the left eye view segment of screen 36 is divided into $n$ portions or increments $\Delta C, \Delta C_1, \Delta C_2 \ldots \Delta C_{n-2}, \Delta C_{n-1}$ (see FIG. 6). Light rays which leave screen portion $\Delta C$ and pass through pupil 217 of the left eye of a viewing observer are rendered almost exactly parallel by spherical portion $\Delta S$ of aspherical surface 219. This is true because the focal length of spherical portions $\Delta S_{n-1}$ and $\Delta S$ are designed to be exactly the distance from $\Delta C_{n-1}$ to $\Delta S_{n-1}$ and $\Delta C$ to $\Delta S$ respectively. Light rays which leave *any* other portion of screen 36 (for example $\Delta C_{21}$) and pass through pupil 217 of the left eye (for example) of a viewing observer are rendered almost exactly parallel by the corresponding spherical portion (for example $\Delta S_{21}$) of aspherical surface 219. As pointed out before, the distortion caused by the transition from one spherical portion to another is considered beneath the resolving power of the eye if α (alpha) is one minute or less.

It will be noted that the arbitrarily chosen lens of the present disclosure is fashioned after the uniform focal length 79 mm. F.L. (i.e. 3.1 inch F.L), 60 mm. diameter (i.e. 2.36 inch diam.) lens set forth in the parent application and the focal length of the peripheral portion $\Delta S_{n-1}$ is the same in both lenses and that the distance between $\Delta S_{n-1}$ and $\Delta C_{n-1}$ is the same for both lenses. In the case of the uniform focal length lens the rays from $\Delta C$ would enter the eye of a viewer as if the image distance were some 15.9 inches while in the case of the present lens, the rays from $\Delta C$ would enter the eye parallel (i.e. as if the image distance were infinity).

Reference is now made to FIG. 7. In order to produce a lens having the above described aspherical surface 219 a grinding wheel 238 (of any abrasive material harder than glass such as corundum) must be formed which has peripheral surface 219'. Surface 219' is identical in cross section to surface 219.

There is provided a drive means 236, such as an electric motor, for rotating the grinding wheel 238 about its axis, the driving being accomplished through grooved pulleys 237 and 241, drive belt 239, and spindle 240 (or any other well known means).

A diamond pointed arm 223 is pivotally mounted upon the member 228 for swinging about point 227. The crank 229 is used to locate point 227 with centering means 230—230 in the same plane (as viewed in the drawing) as the axis of the grinding wheel 238. Worm gear member 225 is held from translational motion, but is allowed to rotate. Worm gear member 224 is held from translational motion relative to member 228, but is allowed rotational motion relative to member 228. Member 228 cannot move vertically relative to member 235. Member 235 is elevated or lowered vertically by a worm gear arrangement including members 233, 232, and 231. Screw 233 is of extremely precise quality, even as precise as that described in the parent case, 275,411 before. The upper part of arm 223 may be made to rotate with member 224 by inserting pointed rod 221 into chamber or hole 222 with handle 220. Rod 221 slips freely in member 226 which is rigidly attached to cylindrical member 224. The lower part of arm 223 is allowed to pivot about 227 only in a plane parallel to the sheet of paper of FIG. 7. The upper member of arm 223 screws into the lower member of arm 223 so that the length of diamond pointed arm 223 may be varied from length $R_1$ to length $R_n$. This screw arrangement is of very precise quality so that distances as small as $\Delta R_1$ may be accurately measured.

In order to form surface 219' the upper member of arm 223 is screwed into the lower member of arm 223 until arm 223 is of length $R_1$ between diamond point 234 and pivotal point 227. At this point grind stone 238 is rotated by drive means 236 through 237, 239, 241 and spindle 240 and member 235 is elevated until diamond point 234 just touches either edge of grind wheel 238. Now arm 223 is rotated about pivot point 227 until diamond point 234 makes the concave surface upon grind wheel 238 have a circular cross section with a radius of curvature equal to $R_1$. At this point the worm gear arrangement including members 231, 232 and 233 is used to lower member 235 a distance equal to $\Delta Y_1$. Now arm 223 is held vertically and pointed member 221 is inserted into hole 222 and worm gear member 224 is rotated by worm gear member 225 until the length of arm 223 is increased a distance equal to $\Delta R_1$. At this point the upper portion of arm 223 is held from rotational motion relative to the lower portion of arm 223 by any well known means such as a set screw. Now arm 221 is taken out of hole 222 and arm 223 is rotated back and forth about point 227 until diamond point 234 will grind no more. In a similar manner the following is done:

235 is lowered $\Delta Y_2$
223 is lengthened $\Delta R_2$
the desired grinding is accomplished
235 is lowered $\Delta Y_3$
223 is lengthened $\Delta R_3$
the desired grinding is accomplished

.

.

.

235 is lowered $\Delta Y_{n-2}$
223 is lengthened $\Delta R_{n-2}$
the desired grinding is accomplished
235 is lowered $\Delta Y_{n-1}$
223 is lengthened $\Delta R_{n-1}$
and the desired grinding is accomplished Of course it is expensive to place surface 219' upon grindwheel 238 in the above described manner. Therefore, it is desirable to find a cheaper manner of doing this. Reference is now made to FIG. 8. Point 249 is of a material which has about the same hardness as the material of grind wheel 238 (corundum for example). Point 243 is of a material (such as a diamond) which has a hardness much greater than that of wheel 242 (which can be of glass for example). Wheels 242 and 238 are aligned so that their left and right surfaces are in the same plane. They are both rotated in a manner obvious from FIG. 7. Rod 251 of square cross section is held from rotation about its horizontal and vertical axis, backward and forward movement, and up and down movement by supporting means 245. However, means 245 allows rod 251 to move translationally to the right or to the left. Rod 244 having points 243 and 249 is held by 251 from rotation about all three of its axes, and from any kind of translational motion relative to rod 251 except vertical translational motion. Springs 247 are at the point of greatest rest when rod 251 is half way between cylinders 246. Rod 244 may be moved past the left surfaces of 242 and 238 and past the right surfaces of 242 and 238. Surface 248 is ground by moving handle 250 back and forth so that rod 244 is to the right of the right surfaces of 242 and 238 and to the left of the left surfaces of 242 and 238 several times. It may now be seen that a cross section of ground surface 248 is identical (for practical purposes) to one of surface 219'.

It may now be seen that if point 243 is made of a material which has the same hardness as the material of wheel 242 (such as glass for example), and point 249 is made of a material which has a hardness much greater than the material used in 238 (such as a diamond) a multiplicity of new surfaces 219' may be cheaply ground upon a corresponding multiplicity of new grind wheels 238 by the apparatus of FIG. 8.

With the apparatus illustrated in FIG. 9 aspherical surface 219 may now be ground upon lens LE-(L or R). A means (such as the well known melted pitch) is provided to adhere LE-(L or R) to cylindrical table 253 which is rotated by spindle 254. Any well known means is provided to rotate spindle 254 and to give it controlled vertical translational motion. Therefore, grind wheel 238 is rotated by its spindle in any well known manner nad unfinished lens LE-(L or R) is rotated and moved upwardly by 253 and 254 until surface 219' forms the desired above described aspherical surface 219 upon a multiplicity of lenses LE-(L and R).

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:
1. A process for making a stepped zone variable radii surface for a wide-angle aspherical lens which has a truncated peripheral extremity, has a second surface on the other side thereof, is made of refractive material having a greater refractive index than the surrounding media and is to be used in conjunction with a wide-angle, relatively flat object plane, comprising the steps of:

first making a spherical surface $\Delta S$ to have a radius of curvature $R_1$, where:

$$R_1 = \frac{(f_1)(r'')(n_1-n_2)}{r'' + (f_1)(n_1-n_2)}$$

and $F_1$ is the distance from $\Delta S$ to $\Delta C$, $r''$ is the radius of curvature of said second surface, $n_1$ is the refractive index of the lens material, $n_2$ is the refractive index of the surrounding media, $\Delta S$ is the central incremental portion of said variable radii surface, $\Delta C$ is the central incremental portion of said object plane, $\Delta S$ has its origin on the optical axis of said variable radii surface, the distance from the center of said variable radii surface to said origin being $Y_1$ and $Y_1$ equals $R_1$;

second making a multiplicity of spherical surfaces $\Delta S_1 \ldots {}_{n-2}$ to have respective radii of curvature $R_2 \ldots {}_{n-1}$ consecutively between $\Delta S$ and $\Delta S_{n-1}$, beginning with $\Delta S_1$ adjacent $\Delta S$ and ending with $\Delta S_{n-2}$, where $\Delta S_1 \ldots {}_{n-2}$ are the multiplicity of individual respective incremental portions of said variable radii surface, each of $\Delta S_1 \ldots {}_{n-2}$ has its origin on the optical axis of and at a respective distance of $Y_1 \ldots {}_{n-1}$ from the center of said variable radii surface, each of $Y_2 \ldots {}_{n-1}$ is respectively greater than $R_2 \ldots {}_{n-1}$, and:

$$R_2 \ldots {}_{n-1} \cong \frac{(f_2 \ldots {}_{n-1})(r'')(n_1-n_2)}{r'' + (f_2 \ldots {}_{n-1})(n_1-n_2)}$$

if each of $R_2 \ldots {}_{n-1}$ and $f_2 \ldots {}_{n-1}$ correspond, $f_2 \ldots {}_{n-1}$ being the corresponding respective distance from $\Delta S_1 \ldots {}_{n-2}$ to $\Delta C_1 \ldots {}_{n-2}$;

third making the spherical surface $\Delta S_{n-1}$ to have a radius of curvature $R_n$, where:

$$R_n = \frac{(f_n)(r'')(n_1-n_2)}{r'' + (f_n)(n_1-n_2)}$$

and $f_n$ is the distance from $\Delta S_{n-1}$ to $\Delta C_{n-1}$, $\Delta S_{n-1}$ is the peripheral incremental portion of said variable radii surface, $\Delta C_{n-1}$ is the peripheral incremental portion of said object plane, $\Delta S_{n-1}$ has its origin on the optical axis of and at a distance of $Y_n$ from the center of said variable radii surface, and $Y_n$ is substantially greater than $R_n$.

2. A process for making a stepped zone variable radii surface for a wide-angle aspherical lens which has a truncated peripheral extremity, has a second surface on the other side thereof, is made of refractive material having a greater refractive index than the surrounding media and is to be used in conjunction with a wide-angle, relatively flat object plane, comprising the steps of:

first making a spherical surface $\Delta S$ to have a radius of curvature $R_1$, where:

$$R_1 = \frac{(f_1)(r'')(n_1-n_2)}{r'' + (f_1)(n_1-n_2)}$$

and $f_1$ is the distance from $\Delta S$ to $\Delta C$, $r''$ is the radius of curvature of said second surface, $n_1$ is the refractive index of the lens material, $n_2$ is the refractive index of the surrounding media, $\Delta S$ is the central incremental portion of said variable radii surface, $\Delta C$ is the central incremental portion of said object plane, $\Delta S$ has its origin on the optical axis of said variable radii surface, the distance from the center of said variable radii surface to said origin being $Y_1$ and $Y_1$ equals $R_1$;

second making a spherical surface $\Delta S_{n-1}$ to have a radius of curvature $R_n$, where:

$$R_n = \frac{(f_n)(r'')(n_1-n_2)}{r'' + (f_n)(n_1-n_2)}$$

and $f_n$ is the distance from $\Delta S_{n-1}$ to $\Delta C_{n-1}$, $\Delta S_{n-1}$ is the peripheral incremental portion of said variable radii surface, $\Delta C_{n-1}$ is the peripheral incremental portion of said object plane, $\Delta S_{n-1}$ has its origin on the optical axis of said variable radii surface and its origin at a distance of $Y_n$ from the center of said variable radii surface, and $Y_n$ is substantially greater than $R_n$;

third making a multiplicity of spherical surfaces $\Delta S_1 \ldots {}_{n-2}$ to have respective radii of curvature $R_2 \ldots {}_{n-1}$ consecutively between $\Delta S$ and $\Delta S_{n-1}$, beginning with $\Delta S_1$ adjacent $\Delta S$ and ending with $\Delta S_{n-2}$ adjacent $\Delta S_{n-1}$, where $\Delta S_1 \ldots {}_{n-2}$ are the multiplicity of individual respective incremental portions of said variable radii surface, each of $\Delta S_1 \ldots {}_{n-2}$ has its origin on the optical axis of said variable radii surface and its origin at a respective distance of $Y_2 \ldots {}_{n-1}$ from the center of said variable radii surface, each of $Y_2 \ldots {}_{n-1}$ is respectively greater than $R_2 \ldots {}_{n-1}$, and:

$$R_2 \ldots {}_{n-1} \cong \frac{(f_2 \ldots {}_{n-1})(r'')(n_1-n_2)}{r'' + (f_2 \ldots {}_{n-1})(n_1-n_2)}$$

if each of $R_2 \ldots {}_{n-1}$ and $f_2 \ldots {}_{n-1}$ correspond, $f_2 \ldots {}_{n-1}$ being the corresponding respective distance from $\Delta S_1 \ldots {}_{n-2}$ to $\Delta C_1 \ldots {}_{n-2}$.

References Cited

UNITED STATES PATENTS 1,286,032  11/1918  Laisne _____ 51—284 X

LESTER M. SWINGLE, *Primary Examiner.*